March 5, 1929.  A. BAILEY  1,704,421
BEET HARVESTER
Filed Dec. 27, 1926  4 Sheets-Sheet 1

Inventor
Amos Bailey.
By
Lacey & Lacey, Attorneys

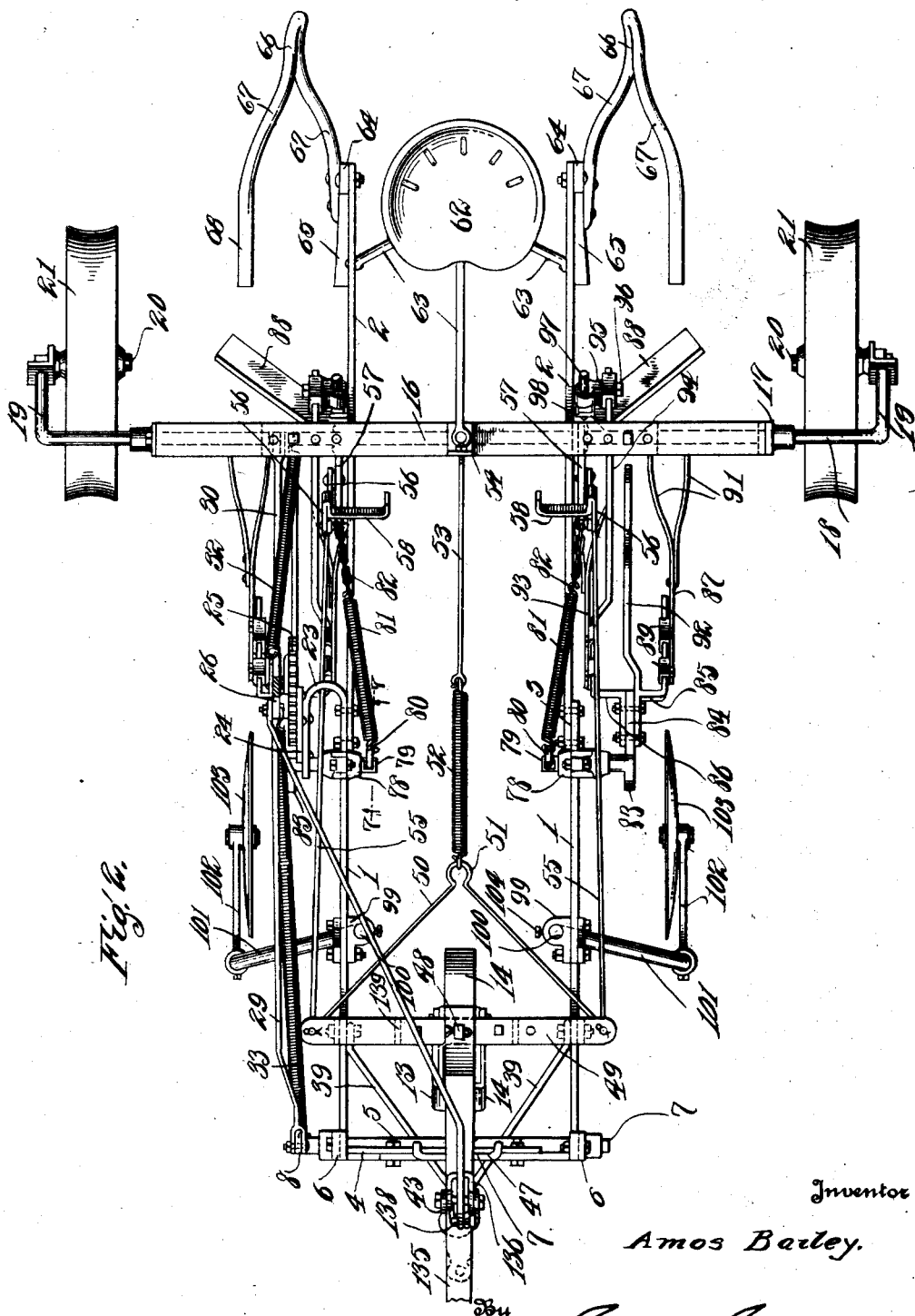

March 5, 1929.  A. BAILEY  1,704,421
BEET HARVESTER
Filed Dec. 27, 1926  4 Sheets-Sheet 3
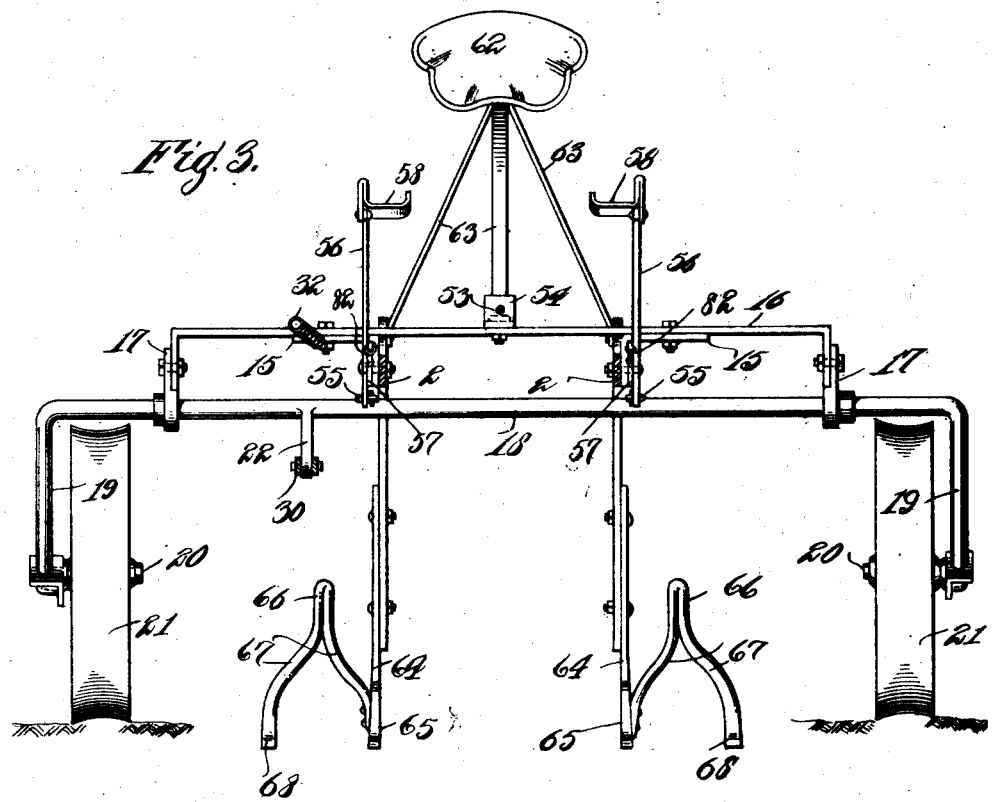
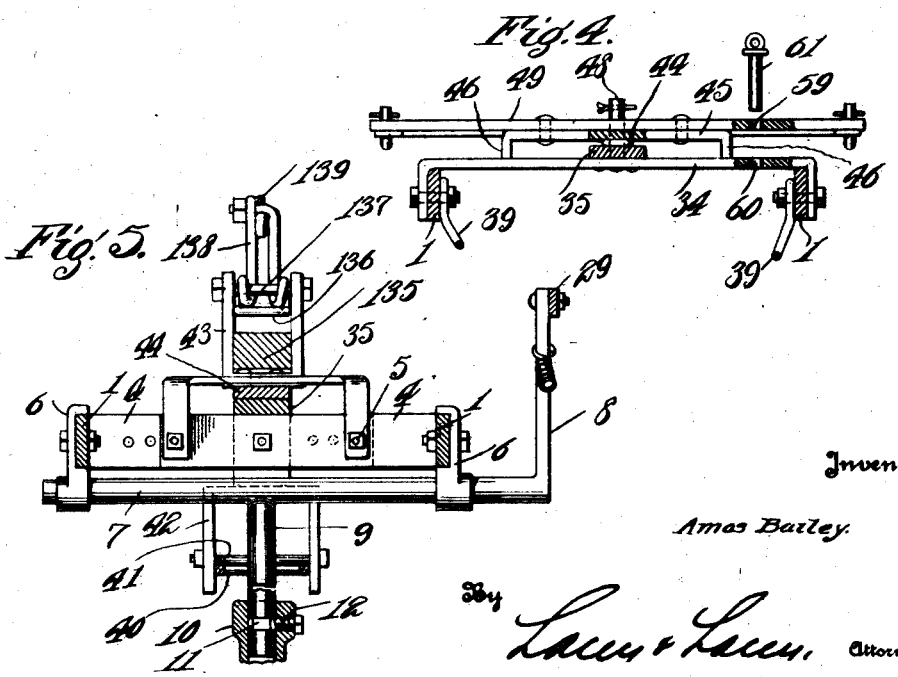
Inventor
Amos Bailey.
By Lacey & Lacey, Attorneys March 5, 1929. A. BAILEY 1,704,421
BEET HARVESTER
Filed Dec. 27, 1926 4 Sheets-Sheet 4
Fig. 6.
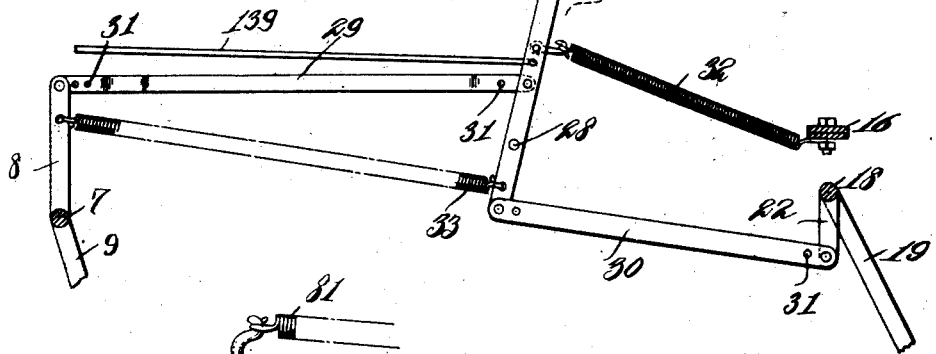
Fig. 7.
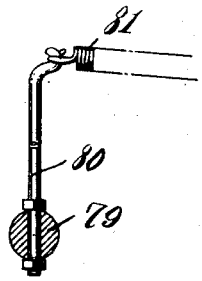
Fig. 8.
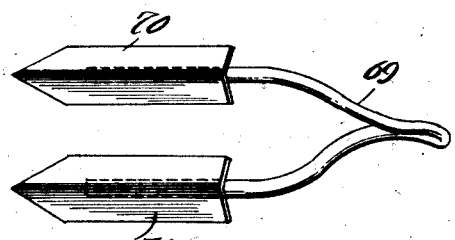
Fig. 9.
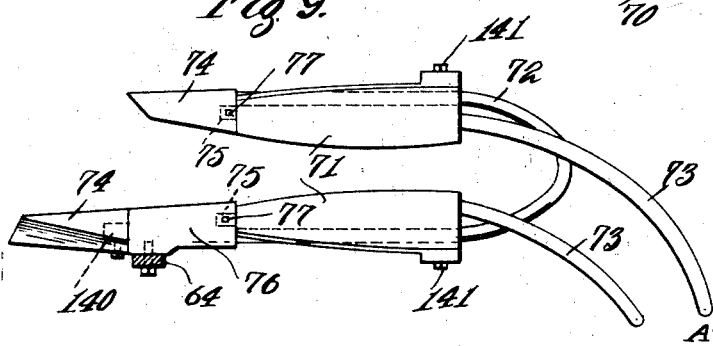
Inventor
Amos Bailey.
By Lacey & Lacey, Attorneys Patented Mar. 5, 1929.

1,704,421

UNITED STATES PATENT OFFICE.

AMOS BAILEY, OF OTTUMWA, IOWA.

BEET HARVESTER.

Application filed December 27, 1926. Serial No. 157,280.

This invention relates to beet harvesters and its object, stated generally, is to provide a machine of simple construction which may be easily drawn over a field along rows of beets and during its progress remove the tops of the beets and dig up the beets, depositing the tops in windrows at one side of a furrow or line of hills and the beet bodies in windrows at the opposite sides of the respective rows or lines of hills. The invention also has for its object the provision of simple and easily manipulated means whereby the active elements may be set to run at the proper depth below the surface of the soil, and another object is to provide means whereby the machine may be properly centered between rows as it progresses. The invention also has for its object the provision of means whereby the beet topping blade may be automatically shifted as may be necessary to properly engage the beet tops and cut through the beets at a uniform depth below the crown. Other objects will appear incidentally in the course of the following description, and the invention resides in certain novel features which are illustrated in the accompanying drawings and will be particularly pointed out in the appended claims.

In the drawings:

Fig. 2 is a plan view partly in section;

Fig. 3 is a transverse section on the line 3—3 of Fig. 1;

Fig. 4 is a detail section on the line 4—4 of Fig. 1;

Fig. 5 is a detail section on the line 5—5 of Fig. 1;

Fig. 6 is an elevation of the shifting lever and the parts cooperating therewith whereby the machine may be raised or lowered accordingly as it is to operate upon the beets or is to be drawn from one field to another field or to a place of storage;

Fig. 7 is a detail section on the line 7—7 of Fig. 2;

Figs. 8 and 9 are plan views showing different forms of diggers.

Figure 1:
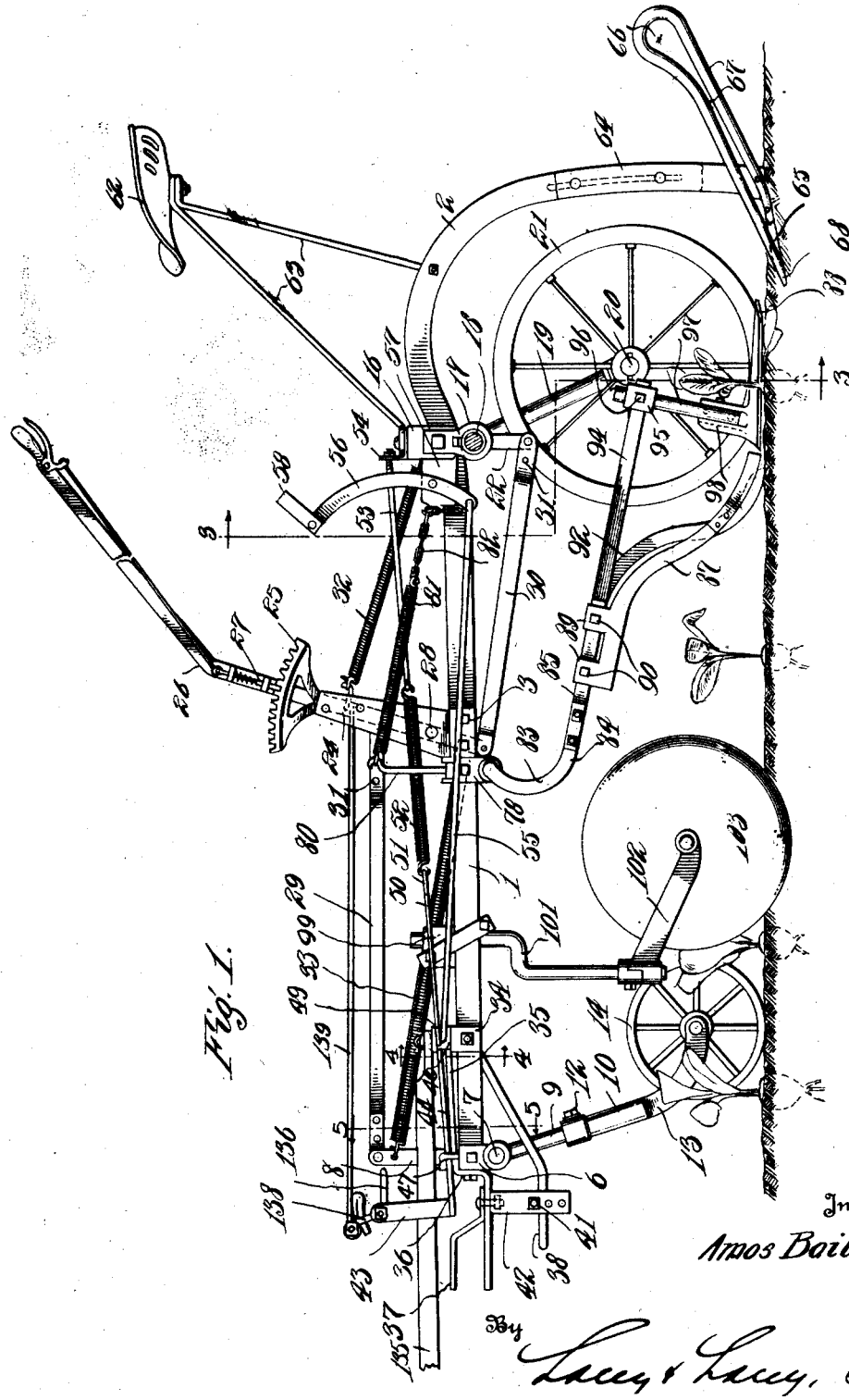
Figure 1 is a side elevation of a beet harvester embodying the present invention, the near rear ground wheel being removed.

In carrying out the present invention, I employ a pair of side beams, each of which consists of a front member 1 and a rear member 2, the rear member being arched and turned downwardly at its rear end, as shown clearly in Fig. 1, whereby to carry a beet digger. The rear members 2 of the side beams are bolted at their front ends to the rear ends of the beam members 1, as shown at 3, so that various forms of beet digger supports may be interchangeably employed if desired. The front ends of the beam members 1 are formed with inwardly projecting lateral extensions or wings 4 which overlap on the central longitudinal line of the machine, as shown clearly in Fig. 2, and are connected by bolts 5 whereby the said beams may be secured together at any desired distance apart so that the machine may be accurately adjusted to the conditions under which it is to be used. At the angles formed by the beam members 1 and the wings 4, bearing brackets 6 are secured thereto, and in the said brackets is mounted a rock shaft 7 extending transversely of the machine and provided with a normally upstanding crank arm 8 at one end. Midway between the bearing brackets 6, the shaft 7 is constructed with a depending arm or spindle 9 which has its lower end fitting within the upper end of a sleeve 10 and provided with an annular groove 11 adapted to be engaged by a set bolt 12 mounted in the wall of the said sleeve whereby the sleeve will be swiveled upon the spindle and will be held against dropping therefrom. The sleeve 10 has its lower end formed with or firmly secured to a fork 13 in which is mounted a caster 14 which is adapted to run upon the ground and support the front end of the machine, it being noted, particularly upon reference to Fig. 1, that the fork 13 is curved rearwardly from the sleeve 10 so that, if the shaft 7 be rocked, the caster wheel 14 will be swung upon an arc having the shaft as its center and, consequently, will be set at a greater or less distance from the plane of the side beams which constitute portions of the main frame and the said frame will, therefore, be supported at a greater or less height from the ground. At points intermediate their length, the rear beam members 2 are rigidly secured to angle brackets 15 which have their upper portions turned outwardly, as shown clearly in Fig. 3, and rigidly secured to the under side of a cross bar 16 which extends over and laterally beyond the beams, as clearly shown. The ends of the said cross bar have bearing brackets 17 rigidly secured thereto and in the said bearing brackets is mounted the rear axle 18 which has depending crank arms 19 at its ends. Carried by the lower ends of the crank arms 19 are spindles 20 which project inwardly from the cranks and upon which the rear ground wheels 21 are rotatably mounted, the arrangement disposing the ground wheels at the inner sides of the crank arms so that the weight of the machine will be placed squarely upon the ground wheels and will be most advantageously carried by them. Near one end, the axle 18 is provided with a depending stud or crank 22 which is disposed substantially in alinement with the crank arm 8 at the end of the front rock shaft 7. Obviously, if the axle 18 be rocked in its bearings, the crank arms 19 will be swung in a manner similar to the swinging movement of the spindle 9 and the rear wheels will be adjusted in the same manner as the front caster 14 is adjusted. The beam member 1 at the right side of the machine has its rear end extended outwardly and then forwardly, as shown at 23, thereby defining a bracket to which is rigidly secured a post or standard 24, the said post or standard being equipped at its upper end with a segmental holding rack 25. A hand lever 26 is fulcrumed upon the outer side of the post 24 and is equipped with the usual latch 27 cooperating with the rack 25 whereby to maintain the lever in a set position, the lever being fulcrumed near the lower end of the post, as indicated at 28, and the fulcrum constituting the center of the arc defined by the rack 25. At a point above the fulcrum 28, a link 29 is pivoted to the hand lever and this link extends forwardly from the lever and is pivoted at its front end to the crank arm 8 so that the movement of the lever will be transmitted to said crank arm and the desired adjusting swinging movement imparted to the shaft 7 and the caster 14 suspended therefrom. To the lower end of the lever 26, which is below the fulcrum 28, a link 30 is pivoted and the said link 30 extends rearwardly and has its rear end pivoted to the end of the crank or stud 22. It will thus be seen that the rear axle 18 and the front rock shaft 7 will be simultaneously adjusted when the hand lever 26 is manipulated and the shifting of the caster 14 and the rear ground wheels 21 will, consequently, have a constant relation. The links 29 and 30 are each provided with a plurality of openings, indicated at 31, whereby the points of their pivotal attachment to the lever or to the respective cranks may be shifted so that, while the caster and the rear wheels will always be swung through equal arcs when the lever is shifted, they may be independently adjusted so that the main frame may be set in a horizontal position or in an inclined position according to the nature of the soil or other conditions of use. It is frequently desirable to have the frame of the machine set at an angle to the horizontal so that the rear end will be either somewhat above or below the front end, and this result is attained by shifting the point of pivotal attachment of the respective links 29 and 30 with the lever or with the respective crank arms so that, while the lever may be manipulated to lift the beet-engaging implements from the ground, as when the end of a row is reached, the relative positions of the front and rear ends of the frame will not be varied and, when the implements are again set in the ground, the frame will resume its given inclination relative to the surface. In order that the hand lever may swing easily and its movement when being shifted will be even, I provide a retractile coiled spring 32 which has its front end attached to the lever at a point above its fulcrum and its rear end secured to the rear cross bar 16 or to the adjacent bracket 15, as will be understood upon reference to Fig. 3, and a similar spring 33 has its rear end attached to the lever adjacent the lower extremity of the same and its front end attached to the crank arm 8.

Near the front end of the machine, a cross bar 34 is secured rigidly to the beam members 1 and extends over the same, and to the said cross bar at the center thereof is secured the rear end of a draft coupling bar 35 which extends forwardly and has its front end turned downwardly and then again forwardly whereby it may be rigidly secured to the wings 4, as shown at 36. Upon the front extremity of this draft bar coupling is carried a bracket 37 whereby a whiffletree or other draft device may be attached to the draft bar, this arrangement being employed when the machine is to be drawn by draft animals. When the machine is to be drawn by a tractor, I employ the draft yoke 38 which consists of the forwardly converging rods 39 having their rear ends rigidly secured to the beam members 1, and preferably by the same bolts which secure the cross bar 34 thereto, the front ends of these rods 39 being connected by or formed into an eye 40 which may be engaged by any drawbar or like device carried by the rear end of the tractor. The front end of this coupling 38 passes under a transverse bolt 41 carried by a clevis 42 which is secured to and depends from the draft bar coupling 35 immediately in front of the wings 4, as shown in Fig. 1. This bolt may be set at higher or lower points in the clevis and thereby hold the draft member in proper position to maintain its engagement with the tractor drawbar notwithstanding the upward pull exerted by such drawbar. The tongue or steering pole 135 which is employed when the machine is drawn by draft animals has its rear end inserted through a yoke 43 disposed above the front end portion of the draft coupling 35 and carried by the front end of a bar 44 which extends rearwardly over the coupling 35 and has its rear extremity formed into a T-head 45 provided with downturned ends or feet 46 resting upon the cross bar 34, as shown clearly in Fig. 4. The forward portion of the bar 44 extends through a stirrup 47 which is secured to the wings 4 or the front end of the frame and passes over the bar 44, as clearly shown in Fig. 5, the lateral movement of the bar 44 being thereby limited and upward movement thereof being prevented. The rear end of the bar 44 is pivotally attached to the cross bar 34 by a king bolt 48 inserted upwardly through the said cross bar, the end of the coupling 35 and the rear end of the bar 44, as shown clearly in Fig. 4. An equalizing bar 49 is also pivotally mounted upon the king bolt 48 and is rigidly secured to the T-head 45 so that the pivotal movement of the T-head will be simultaneous with a similar movement of the equalizing bar. The end of the tongue 135 is also fitted over the king bolt so that it may have some relative vertical rocking movement but lateral movement is prevented by the sides of the stirrup 43. To the ends of the equalizing bar are pivotally attached the front ends of a yoke or bail 50 having an eye 51 at its center in which is engaged the front end of a coiled spring 52, the rear end of which is attached to a link or rod 53 which has its rear end adjustably secured in a bracket 54 secured upon the rear cross bar 16 at the center of the same. This spring 52 exerts a pulling force equally upon the two ends of the equalizing bar 49 and thereby tends to counteract the whipping action of the tongue or steering pole during the travel of the machine. At each end of the equalizing bar, there is pivoted the front end of a connecting rod 55 which extends rearwardly and is pivoted at its rear end to the lower end of a foot lever or pedal 56 fulcrumed upon a bracket 57 secured to the rear cross bar 16 or to the down-turned member of the adjacent bracket 15. The foot rests 58 at the upper ends of the pedals 56 project inwardly, as shown clearly in Figs. 2 and 3, so that they may be conveniently reached by the feet of the driver, and it will be understood that by pressing forwardly upon either pedal a rearward pull will be exerted upon the corresponding end of the equalizing bar 49 so that the tongue may be kept on the central line of the machine notwithstanding shifting of the machine to a limited extent as it passes over a rough surface or for any other cause it may depart more or less from a rectilinear path. The equalizing bar is provided with an opening 59 therethrough registering with a similar opening 60 in the cross bar 34 and a pin 61 may be engaged in the said openings so that the equalizing bar will be locked to the cross bar, and the machine, consequently, caused to travel directly behind and on the same line with a tractor when a tractor is employed as the draft agency. The operator's seat 62 is carried at the rear end of the machine by supporting rods 63 secured to and rising from the cross bar 16 and the beam members 2, as shown and as will be understood.

By permitting a limited vertical rocking movement of the tongue 135, the weight of the machine is taken off the necks of the draft animals. I have found that if the weight of the machine be taken off the castor 14, the machine can be more easily turned at the end of travel in one direction and brought into position for the return trip across the field, and I have, therefore, provided means whereby the tongue may be locked against rocking movement in the stirrup 43. A bail or crank 136 is hung on a rod 137 secured across the stirrup, and this crank or bail is formed with an extension 138 constituting a lever to which is attached the front end of a connecting rod 139, the rear end of said rod being pivoted to the lever 26 so that when the spindle 9 is rocked downwardly the bail 136 will also be rocked downwardly to hold the tongue against the bottom of the stirrup 43. I have found that by the use of the crank or bail 136 in the stated manner the machine may be practically balanced on the rear wheels. Of course, when the spindle 9 is rocked rearwardly, the crank 136 is rocked upwardly to free the tongue.

The beet diggers are carried by the lower rear ends of the beam members 2 and they may be given various forms suitable to accomplish the desired results. Referring particularly to Figs. 1, 2 and 3, it will be noted that supplemental standards 64 are secured to the extremities of the beam members 2 and may be adjusted vertically thereon so that the diggers may be accurately set to run at the desired depth. In the said figures, the diggers are shown as including shares 65 projecting forwardly from the lower ends of the supplemental standards 64, and secured to the outer side of each share 65 is a beet turning or deflecting member consisting of a rod doubled upon itself and twisted to define a loop 66 disposed approximately vertically and from which arms 67 diverge forwardly and downwardly, the outer arm 67 terminating in a sharpened point 68 adapted to enter the ground at a point spaced from the point of the share 65 a distance sufficient to accommodate a beet body between the two points and at the same time close enough to uproot the beet body as the machine proceeds along the row. By referring to Fig. 2 more particularly, it will be noted that the outer arm 67 is disposed above the inner arm 67 and, consequently, the forward travel of the digger will bring the said arms into contact with the beet body in such a manner that the latter will be positively lifted from the ground and turned inwardly so that the beets taken up from two adjoining rows will be deposited in a line between the rows whence they may be easily gathered by another operator.

As was said, the diggers may have various forms. In Fig. 8, I have shown a shank or deflecting member 69 which is substantially the same as the arms 67 and loop 66 shown in Figs. 1, 2 and 3, and previously described. To the forward extremities of this deflecting member 69 are secured blades 70 which may be cultivator shovels of well-known form and are arranged to enter the ground at opposite sides of the beet and positively uproot the beet so that it will be turned aside by the deflecting member exactly as it would be turned aside by the arms 67 in the previously described arrangement. In Fig. 9 I have shown another form of digger in which two somewhat elongated plates 71 are secured in parallel relation upon a support 72 consisting of a light rod or stout wire bent into substantially U-shape and adapted to bridge the space at the rear ends of the plates 71. These plates converge downwardly and inwardly on lines transverse to the line of travel so that they will support the beet between them and maintain it in proper position to be deflected laterally by the arms 73 which engage the uprooted beet body and turn the same into the windrow in an obvious manner. In the arrangement shown in Fig. 8, the shovels or blades 70 have integral tapered front ends which constitute digging points to enter the ground. In the arrangement shown in Fig. 9, the plates 71 terminate at or short of the front ends of the support 72 and digging points 74 are provided in advance of the lifting plates 71. Each plate 71 is provided at its front with a forwardly projecting tongue or tenon 75 adapted to fit in a socket provided therefore in the rear end of the corresponding point 74 or in an intermediate block 76, the parts being secured in the desired angular relation by set screws 77 bearing upon the tongues or tenons in an obvious manner. The intermediate block 76 is engaged with and carries the corresponding point 74 in a similar manner, as indicated at 140, said intermediate block being secured to the supporting standard. The tenons are circular in cross section, providing for rotative adjustment, and the lifting plates may also be rotated upon the respective arms of the support 72, being secured in a set position by set screws 141. By thus adjusting the plates, their inner edges may be set closer together or farther apart as may be suggested by the crop and caused to engage the beets with the most advantageous gripping and lifting action. It will be understood, of course, that the elements 71, 74 and 76 present surfaces inclined upward from front to rear so that the beets will be lifted from the ground as the machine advances along the row. It will be noted that the provision of the intermediate block 76 sets one point 74 ahead of the other point, and this arrangement is very desirable as the dirt is loosened at one side of the beet before the real digging action begins and the lifting plates will then raise the beets whole instead of leaving parts broken off in the ground. Moreover, by lifting the beets and turning them to one side they are deposited between the rows instead of on the rows of broken or plowed ground and adhering earth will be shaken from them and fall onto the broken ground at the rear of the diggers. Consequently, when the beets are gathered they are in clean marketable condition.

At intermediate points of the side members of the main frame and preferably just in advance of the rear ends of the beam members 1, I secure to said beam members bearing brackets 78 in each of which a rock shaft 79 is loosely fitted so that it may not only rotate or turn about its own longitudinal axis but may also have slight oscillatory movement in a plane substantially parallel to the horizontal plane of the beam. In the inner end of each rock shaft is secured a radial arm 80 which projects upwardly therefrom and has attached to its upper extremity the front end of a coiled spring 81 which has its rear end connected by a chain or other flexible element 82 with the bracket 57 or some other convenient fixed point at the rear of the machine. At the outer end of each rock shaft 79 is a downturned crank arm 83 which has its extremity turned rearwardly, as indicated at 84. To the extremity 84 of the said crank arm are secured bracket or frame members 85 and 86, each of said brackets having a lateral portion and a rearwardly and downwardly extending terminal portion, as shown most clearly in Fig. 2. To the terminal portion of the outer bracket 85 is secured a guiding runner 87 which is adapted to run upon the ground at the outer side of the row of beets and, should any one beet be out of alinement with the adjacent beets, the said runner by its contact with the body of the beet will tend to press the beet inwardly and at the same time will oscillate the bracket to some extent so that the beet will be placed directly in the path of the topping blade 88. The runner 87 is provided at its upper front end with rings or loops 89 encircling the rear end of the bracket member 85 and secured thereto by set bolts 90 so that the proper engagement of the runner with the ground will be attained. It is also to be noted that, as shown most clearly in Fig. 2, the ground-engaging extremities of the runner consist of a pair of fingers 91, preferably resilient, so that bruising of the beet bodies will be avoided while at the same time they will be engaged with sufficient force to be properly centered with respect to the cutter. At the inner side of the bracket 85, there is provided a presser arm 92 which extends rearwardly and downwardly therefrom and is adapted to ride over the tops of the beet bodies so that, if a beet body should have grown from the ground to a greater extent than the average, this presser arm will ride over the beet and will be thereby swung upwardly to set the blade to cut through the beet at a set distance below the crown. The spring 81 acts constantly to hold the presser arm 92 to the surface of the ground so that it will be positively engaged with the tops of the successive beets and, therefore, when a beet is abnormally high or abnormally low, the spring will act to rock the shaft 79 in the proper direction to cause the presser arm to ride on the beet and this rocking movement will be transmitted to the blade carrier so that the blade will cut through all the beets at a uniform distance below the crown. The runners 91 also serve to turn aside any pebbles or stones which might tend to destroy the efficiency of the topper blade, and, by their contact with the beet bodies or other objects encountered in their travel, they not only set beet bodies in proper position to be engaged by the topping blade but also impart a slight lateral movement to the frame members carried by the rock shaft 79 to hold the topping blade across the line of plants. A second runner 93, similar in all respects to the runner 87, is carried by the end portion of the inner bracket 86, and this inner bracket 86 also has secured thereto or formed therewith a beam 94 which extends rearwardly and downwardly and has a box 95 mounted upon its rear end and secured thereto by a set bolt 96 whereby the box may be shifted along the beam as may be necessary. A post 97 is mounted in the box 95 and depends therefrom to a point near the ground where it is fitted within a socket member or box 98, the said box or socket member 98 being formed integral with or rigidly secured to the topping blade 88. The box or socket 98 is secured to the lower end of the post 97 by set screws so that it may be angularly adjusted and the blade 88 thereby set to run at any desired angle. It will be noted that the blade is set so that its outer end is in rear of its inner end and its surface is inclined somewhat upwardly, the result of this form and arrangement of the blade being that, as a top is cut from a beet, it will be simultaneously deflected outwardly and discharged over the outer rear end of the blade in a windrow between two adjoining rows or lines of hills. It will thus be seen that after the entire field has been traversed the beet bodies and the tops will be deposited in separate windrows extending across the field and may be separately gathered.

Upon each side beam member 1 at a point in rear of the cross bar 34 and between said bar and the bearing brackets 78, I secure the bearing brackets or boxes 99 which receive the upper vertical ends of spindles 100 which are provided with off-set portions 101 at intermediate points of their heights and have rearwardly extending arms 102 mounted upon their lower ends, colter disks 103 being carried by the free ends of said arms 102 to run in the ground in advance of the topping implements, as shown. The spindles 100 are secured in the brackets 99 by set screws or bolts 104 so that the colters 103 may be caused to run at any desired depth and the spindles may also be rotated in the bearings and secured in any desired position, thereby setting the colter disks to run at a desired angle to the line of travel and at a desired distance laterally from the beams 1. These colters serve to loosen the soil at the sides of the beets so that they will be more readily engaged by the topping blades and the diggers and they also aid in keeping the machine to a straight line of travel.

From the foregoing description, taken in connection with the accompanying drawings, it will be seen that I have provided a simple and compact machine which is adapted to act upon two rows of beets simultaneously and in its travel remove the tops of the beets and then uproot the beets, the tops and the beets being formed into windrows disposed alternately across the field. While the machine is very efficient in operation, it is of light draft and easily adjusted. The equalizing bar and its cooperating elements serve to relieve the draft animals of the ill-effects caused by whipping of the steering pole in machines as ordinarily constructed and enable the driver of the machine to easily hold it to the desired relation to the rows. If the hand lever 26 be swung rearwardly, the rock shaft 7 and the rear axle 18 will be rocked so that the cranks and spindles carried by said shaft and axle will serve as levers fulcrumed upon the ground to lift the frame and, consequently, withdraw the colters, the topping elements and the diggers from the ground and support them above the surface so that the machine may be driven to another field or may be easily turned at the end of a row, and if the lever be returned to its former position the several working elements will be at once restored to their proper working positions. It will be understood, of course, that the machine may be built to act on only one row at a time, and the working elements may also be set so as to deflect the beet bodies outwardly and the tops inwardly instead of the arrangement shown and described.

Having thus described the invention, I claim:

1. In a beet harvester, the combination of a supporting frame including a standard, a pair of spaced digging points supported by said standard, a connection between the rear ends of said points below the surfaces thereof whereby they will be held in spaced relation, and an inwardly, upwardly and rearwardly inclined deflecting element connected directly to the rear end of the outer point to turn uprooted beet bodies to the inner side of the digger.

2. In a beet harvester, a digger comprising transversely spaced points, lifting plates in rear of and alined with the points, and means for rotatively adjusting the lifting plates to vary the distance between their lower edges, the points and the plates presenting continuous beet-engaging surfaces.

3. In a beet harvester, a digger comprising parallel points, one point being set in advance of the other point.

4. In a beet harvester, a digger comprising a support, parallel transversely inclined lifting plates secured upon the support and rotatable thereon, and points in advance of and alined with the respective plates.

In testimony whereof I affix my signature.

AMOS BAILEY. [L. S.]